(12) United States Patent
Rajagopalan et al.

(10) Patent No.: US 9,485,840 B2
(45) Date of Patent: Nov. 1, 2016

(54) SENSING WITHIN A REGION (71) Applicant: KONINKLIJKE PHILIPS N.V., Eindhoven (NL)

(72) Inventors: Ruben Rajagopalan, Neuss (DE); Harry Broers, S-Hertogenbosch (NL); Petrus Johannes Arnoldus Hubertus Kuijten, Deurne (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/908,244

(22) PCT Filed: Jul. 23, 2014

(86) PCT No.: PCT/EP2014/065821
§ 371 (c)(1),
(2) Date: Jan. 28, 2016

(87) PCT Pub. No.: WO2015/022157
PCT Pub. Date: Feb. 19, 2015

(65) Prior Publication Data
US 2016/0174339 A1 Jun. 16, 2016

(30) Foreign Application Priority Data
Aug. 15, 2013 (EP) .................... 13180546

(51) Int. Cl.
*H05B 37/02* (2006.01)
(52) U.S. Cl.
CPC ................ *H05B 37/0227* (2013.01)

(58) Field of Classification Search
CPC .. G08B 13/1895; G08B 13/19; G08B 17/12; G08B 19/005; H05B 37/0218; H05B 37/0227; H05B 37/0245; Y02B 20/44; Y02B 20/46
See application file for complete search history.

(56) References Cited

U.S. PATENT DOCUMENTS

| | | |
|---|---|---|
| 2002/0175815 A1 | 11/2002 | Baldwin |
| 2010/0007491 A1 | 1/2010 | Kleihorst et al. |
| 2010/0277333 A1 | 11/2010 | Van De Sluis et al. |
| 2013/0069543 A1 | 3/2013 | Mohan et al. |

FOREIGN PATENT DOCUMENTS

| | | |
|---|---|---|
| EP | 2278419 A1 | 1/2011 |
| JP | 2008158755 A | 7/2008 |
| WO | 2008135942 A1 | 11/2008 |

*Primary Examiner* — Monica C King
(74) *Attorney, Agent, or Firm* — Meenakshy Chakravorty (57) ABSTRACT

A controller comprising a control module configured to: use a non-optical sensor to perform motion detection; in response to the non-optical sensor detecting motion whilst one or more lighting device is operating in a first state whereby the lighting device(s) illuminates an environment according to a first level or emits no light, control the lighting device(s) to operate in a second state whereby the lighting device(s) illuminates the environment according to a second level higher than the first level, use a light sensor to perform motion detection whilst the lighting device(s) is operating in the second state; if no motion is detected by the light sensor, control the lighting device(s) to operate in the first state or a further state; and in response to the light sensor detecting motion, control the lighting device(s) to illuminate the environment according to a third level higher than the second level.

15 Claims, 5 Drawing Sheets

SENSING WITHIN A REGION

CROSS-REFERENCE TO PRIOR APPLICATIONS

This application is the U.S. National Phase application under 35 U.S.C. §371 of International Application No. PCT/EP2014/065821, filed on Jul. 23, 2014, which claims the benefit of European Patent Application No. 13180546.7, filed on Aug. 15, 2013. These applications are hereby incorporated by reference herein.

TECHNICAL FIELD

The present disclosure relates to the sensing of a being or other object within a region of a space. For example the sensing may be used to control one or more lighting devices in dependence on a detected occupancy within an indoor or outdoor space.

BACKGROUND

In current lighting applications, energy efficiency is a more and more important subject. One possible way to reduce the energy consumption of a lighting system is to switch off or dim one or more light sources thereof when no persons or objects are present in a space, and conversely to switch on the light(s) when a person or an object is present in the space. In order to do this, the presence of a person or object in the relevant space has to be detected. Different types of presence sensors are currently in use.

There is a strong need for sensor-driven light control systems, because of their advantage of bringing down the energy consumption of the light source(s) thereof, and thereby improving cost-savings, and life-time of the light source(s).

Some sensor driven light control systems employ light sensors (e.g., cameras, Position Sensitive Devices (PSD) etc.) that require minimum threshold ambient light levels for accurate sensing. Such light sensors tend to be used because in general they are more accurate than sensors such as passive infrared sensor (PIR) sensors, provided that the minimum threshold ambient light levels are met. However, for some such systems, it is possible that the minimum threshold ambient light levels will not always be met; for example, such systems may drive their respective light source(s) at very low dim levels, or even turned off for energy saving needs, which can lead to ambient light levels which do not meet the required minimum threshold.

SUMMARY

The inventors have recognized that in low ambient light level conditions, the light sensors will perform poorly and due to the sensitivity of non-optical sensors, the non-optical sensors will produce false triggers which dim-up the lighting device controlled by the non-optical sensor in situations that are undesired, and this results in undesired energy expenditure.

According to one aspect disclosed herein, there is provided a controller comprising: an output for controlling one or more lighting device to illuminate an environment; an input for receiving motion detection signals from a non-optical sensor and from a light sensor; and a control module configured to: use the non-optical sensor to perform motion detection; in response to receiving a signal indicative of sensed motion from the non-optical motion sensor whilst the one or more lighting device is operating in a first operating state in which the one or more lighting device illuminates the environment according to a first illumination level or emits no light, control the one or more lighting device to operate in a second operating state in which the one or more lighting device illuminates the environment according to a second illumination level, the second illumination level being higher than the first illumination level; use the light sensor to perform motion detection whilst the one or more lighting device is operating in the second operating state; if no motion is detected by the light sensor, control the one or more lighting device to operate in the first operating state or a further operating state in which the one or more lighting device illuminates the environment according to an illumination level lower than the second illumination level; and in response to receiving a signal indicative of sensed motion from the light sensor, control the one or more lighting device to operate in a third operating state in which the one or more lighting device illuminates the environment according to a third illumination level, the third illumination level being higher than the second illumination level.

In an example application there is provided a lighting system comprising the controller, the non-optical sensor, the light sensor, and the one or more lighting device.

According to a further aspect, there may be provided a computer program product for performing sensing using a non-optical sensor and a light sensor to control one or more lighting device to emit light, the computer program product comprising code embodied on a computer-readable medium and being configured so as when executed on a processor to: use the non-optical sensor to perform motion detection; in response to receiving a signal indicative of sensed motion from the non-optical motion sensor whilst the one or more lighting device is operating in a first operating state in which the one or more lighting device illuminates the environment according to a first illumination level or emits no light, control the one or more lighting device to operate in a second operating state in which the one or more lighting device illuminates the environment according to a second illumination level, the second illumination level being higher than the first illumination level; use the light sensor to perform motion detection whilst the one or more lighting device is operating in the second operating state; if no motion is detected by the light sensor, control the one or more lighting device to operate in the first operating state or a further operating state in which the one or more lighting device illuminates the environment according to an illumination level lower than the second illumination level; and in response to receiving a signal indicative of sensed motion from the light sensor, control the one or more lighting device to operate in a third operating state in which the one or more lighting device illuminates the environment according to a third illumination level, the third illumination level being higher than the second illumination level.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Figure 1:
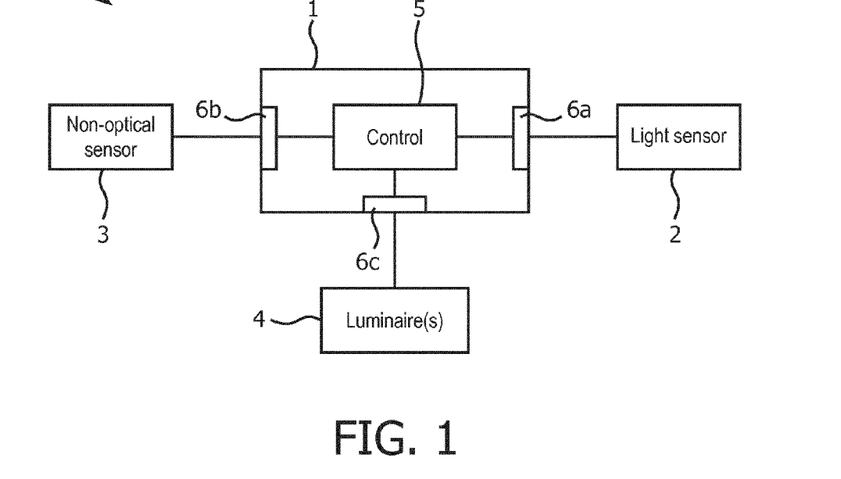
FIG. 1 is a schematic block diagram of a lighting system.

Reference is first made to FIG. 1 which illustrates a schematic block diagram of a lighting system 100.

The lighting system 100 comprises a controller 1 coupled to a light sensor 2, a non-optical sensor 3, and one or more lighting devices 4 in the form of one or more luminaires operable to emit light to illuminate an environment of the lighting system 100.

The light sensor 2 may comprise, for example, a camera or a Position Sensitive Device/Detector (PSD). The light sensor 2 is configured to detect motion in a sensing region (SR) associated with the light sensor 2. If the light sensor 2 detects motion in the SR associated with the light sensor 2, the light sensor 2 is configured to transmit a signal indicative of sensed motion to the controller 1. As a matter of terminology, the term "light" with reference to sensor 2 is used herein to denote that the sensor 2 may sense light in the visible frequency band (wavelengths from 390-700 nm for a typical human eye) in order to detect motion in its SR.

The non-optical sensor 3 is configured to detect motion in a SR associated with the non-optical sensor 3. If the non-optical sensor 3 detects motion in the SR associated with the non-optical sensor 3, the non-optical sensor 3 is configured to transmit a signal indicative of sensed motion to the controller 1.

As a matter of terminology, the term "non-optical" with reference to sensor 3 is used herein to denote that the sensor 3 may use mechanical radiation to detect motion in its SR. For example, the non-optical sensor 3 may be an ultrasound sensor. An ultrasound sensor sends out a signal in the form of a series of bursts of acoustic waves (or a continuous wave) at an ultrasonic frequency, e.g. 40 kHz. The ultrasound sensor then uses the echoes it receives back from the environment to determine whether there is presence in that environment. Alternatively the sensor 3 may use electromagnetic radiation to detect motion in its SR, in which case the term "non-optical" is used herein to denote that the sensor 3 senses light outside of the visible frequency band (see above) in order to detect motion in its SR. That is, the sensor 3 senses light in the non-visible part of the electromagnetic spectrum in order to detect motion in its SR. For example, the non-optical sensor 3 may comprise a passive infra-red (PIR) sensor or a radar sensor.

The controller 1 comprises a control module 5 which is coupled to the light sensor 2 via a first interface 6a and to the non-optical sensor 3 via a second interface 6b. Whilst FIG. 1 shows separate interfaces for each sensor, it will be appreciated that the control module 5 may be coupled to both the light sensor 2 and the non-optical sensor 3 via a single interface of the controller 1.

The control module 5 is configured to receive a signal indicative of sensed motion from the light sensor 2 via interface 6a when the light sensor 2 detects motion in its SR.

Similarly, control module 5 is configured to receive a signal indicative of sensed motion from the non-optical sensor 3 via interface 6b when the non-optical sensor 3 detects motion in its SR. The control module 5 is configured to control the light sensor 2 to perform motion detection by transmitting appropriate control signals via interface 6a.

The control module 5 is further configured to control the amount of light emitted from the luminaire(s) 4 by transmitting appropriate control signals to the luminaire(s) 4 via interface 6c. The functionality of the control module 5 of the controller 1 may be implemented in code (software) stored on a memory comprising one or more storage media, and arranged for execution on a processor comprising on or more processing units. The code is configured so as when fetched from the memory and executed on the processor to perform operations in line with embodiments discussed below. Alternatively it is not excluded that some or all of the functionality of the control module 5 is implemented in dedicated hardware circuitry, or configurable hardware circuitry like an FPGA.

The luminaire(s) 4 are configured to operate in a plurality of operating states. When the luminaire(s) 4 operate in a first operating state, the luminaire(s) 4 consume the least energy. When the luminaire(s) 4 operate in the first operating state the luminaire(s) 4 illuminate the environment of the lighting system 100 by emitting light at a first illumination level (i.e. at a very low dim level) or emits no light (i.e. the luminaire(s) 4 are turned off). Reference to an "illumination level" used herein refers to the amount of light output from the luminaire(s) 4. The illumination level can be expressed in terms of illuminance (in lux) i.e. in terms of the amount of light emitted from the luminaire(s) 4 that is incident over a plane of interest (e.g. a road surface). It will be appreciated that other photometry units may also be used to express the amount of light output from the luminaire(s) 4. It will be appreciated that when the luminaire(s) 4 operate in the first operating state, energy is conserved. However when the luminaire(s) 4 operate in a first operating state, motion detection performed by the light sensor 2 may be unreliable due to the absence of the required amount of light incident on the light sensor 2 for accurate sensing.

When the luminaire(s) 4 operate in a second operating state the luminaire(s) 4 illuminate the environment of the lighting system 100 by emitting light at a second illumination level, the second illumination level being higher than the first illumination level. When the luminaire(s) 4 operate in the second operating state by emitting light at a second illumination level, the luminaire(s) 4 consumes more energy than when the luminaire(s) 4 operate in the first operating state. The second illumination level is high enough that motion detection via light sensor 2 becomes reliable, but the second illumination level is not high enough to provide good illumination in the environment of the lighting system 100. The second illumination level is set during calibration of the lighting system because the second illumination level is limited by the sensitivity of the light sensor 2. For example, the second illumination level may be set to 20% of the maximum light level emitted by the luminaire(s) 4. In this example, if an illuminance over a plane of interest of 20 lux is achieved when the luminaire(s) 4 emit light at their maximum light level (i.e. 100%), then the second illumination level corresponds to the luminaire(s) 4 emitting light at a level such that an illuminance over the plane of interest of 4 lux is achieved. In the case of a more sensitive light sensor 2, the second illumination level could be decreased.

When the luminaire(s) 4 operate in a third operating state the luminaire(s) 4 illuminate the environment of the lighting system 100 by emitting light at a third illumination level, the third illumination level being higher than the second illumination level. When the luminaire(s) 4 operate in the third operating state by emitting light at the third illumination level, the luminaire(s) 4 consumes more energy than when the luminaire(s) 4 operate in the second operating state. The third illumination level is high enough to provide good illumination in the environment of the lighting system 100. The third illumination level is set during calibration of the lighting system in dependence on the application of the lighting system 100. For example, if the lighting system 100 is to be used in an outdoor street light suitable for lighting car parks and roads etc., the third illumination level may be set such that lighting regulations for the geographical location in which the outdoor street light is to be used in are met. As a mere example the Chinese standard CB 45-2006 specifies that an average illuminance of a road surface of a local road of 8 lux must be met.

Figure 2A:
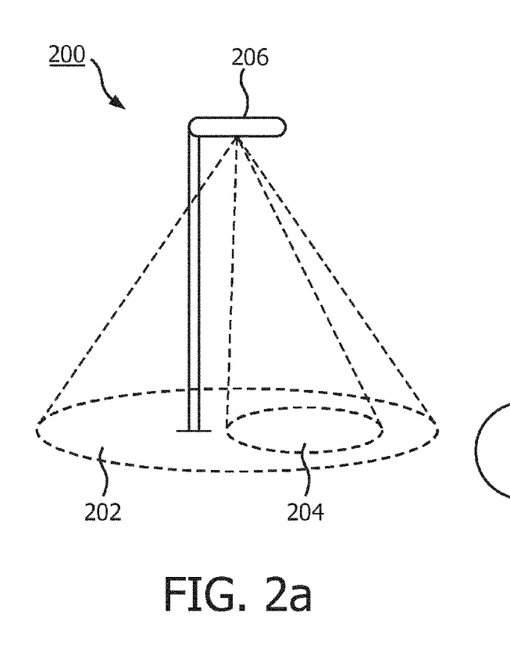
FIG. 2a illustrates sensing regions of sensors of the lighting system when the lighting system is used in an outdoor street light.
Figure 2B:
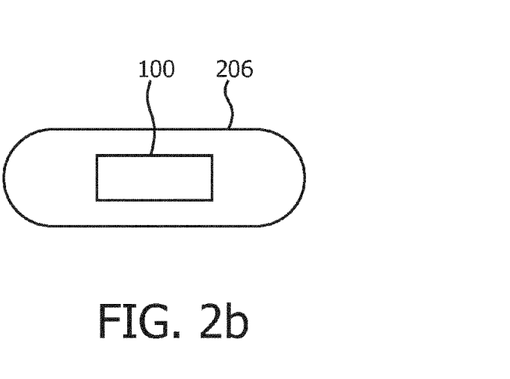
FIG. 2b illustrates the lighting system incorporated in a portion of an outdoor street light.

The lighting system 100 may be placed in an environment comprising an indoor or outdoor space such as an office space, an interior space within a home, a laboratory, a marquee, or garden etc. FIG. 2a illustrates sensing regions of sensors of the lighting system 100 when the lighting system 100 is used in an outdoor street light 200 suitable for lighting car parks and roads etc. FIG. 2b illustrates the lighting system 100 incorporated in a portion 206 of the outdoor light 200.

Both the light sensor 2 and the non-optical sensor 3 are arranged to generate presence-related information from a respective SR, e.g. corresponding to an area on the floor or a three dimensional volume. The SR may be defined in part by the range of the sensor. The respective SRs of the light sensor 2 and the non-optical sensor 3 may partially or completely overlap or may not overlap at all. As a mere example, FIG. 2a shows the SR 202 of the light sensor 2 completely overlapping the SR 204 of the non-optical sensor 3. A process 300 for controlling the amount of light emitted from the luminaire(s) 4 is now described in more detail with reference to FIG. 3a.

Figure 3A:
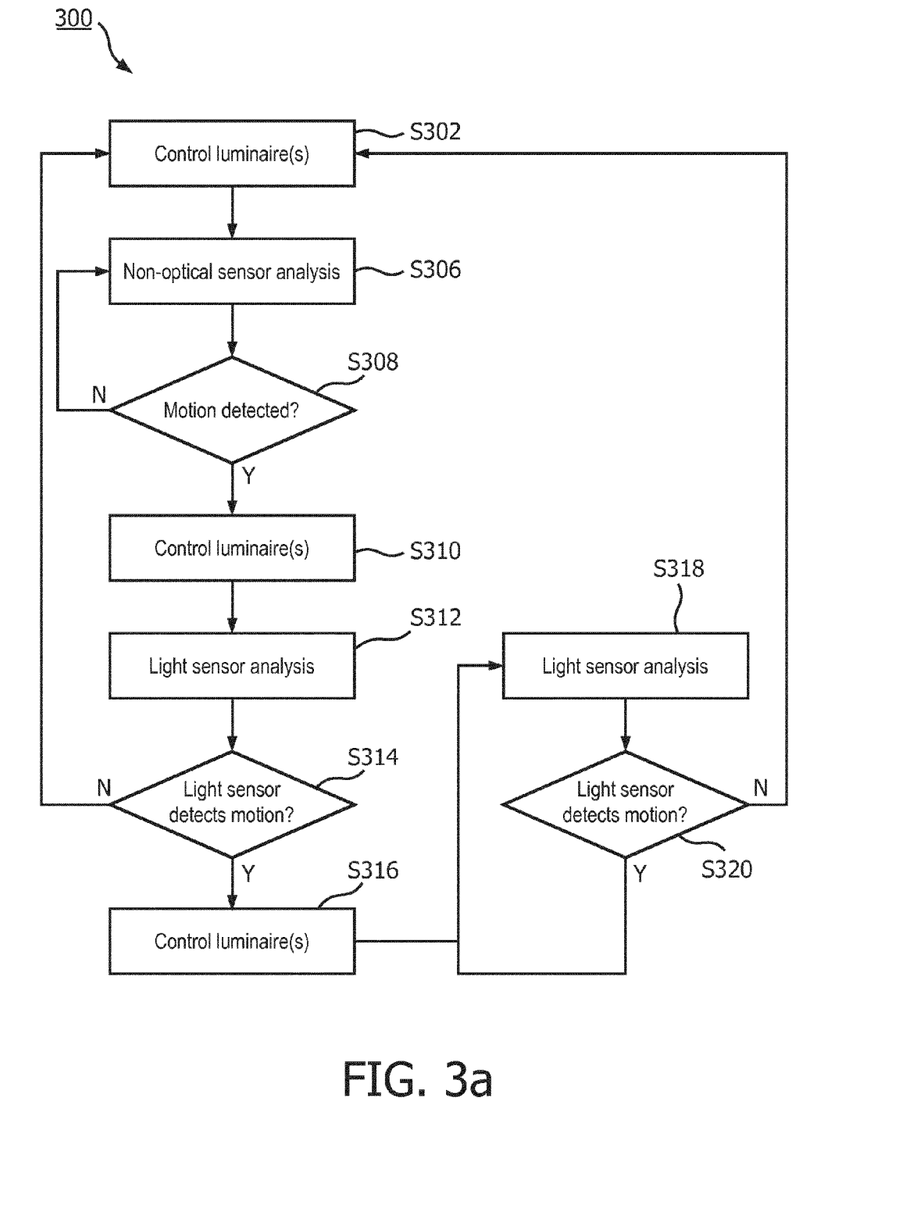
FIG. 3a is a schematic flow chart of a sensing method.

At step S302, the control module 5 controls the luminaire(s) 4 to operate in the first operating state. As indicated above, when operating in the first operating state the luminaire(s) 4 emit light at a first illumination level or emit no light at all (i.e. the luminaire(s) 4 are turned off).

The process 300 then proceeds to step S306 where the control module 5 uses the non-optical sensor 3 to perform motion detection such that the non-optical sensor 3 is able to detect motion in the SR associated with the non-optical sensor 3.

Whilst no motion is detected by the non-optical sensor 3 in the SR associated with the non-optical sensor 3, the luminaire(s) 4 continue operating in the first operating state and the non-optical sensor 3 continues to operate to perform motion detection. This is represented in FIG. 3a by the process 300 proceeding back to step S306 following no motion being detected by the non-optical sensor 3 at step S308.

If the control module 5 receives a signal indicative of sensed motion (i.e. a motion detection signal) from the non-optical sensor 3 indicating that the non-optical sensor 3 has detected motion in the SR associated with the non-optical sensor 3 at step S308, the process 300 proceeds to step S310 where the control module 5 dims-up (i.e. increases) the light emitted from the luminaire(s) 4 by controlling the luminaire(s) 4 to operate in the second operating state such that the luminaire(s) 4 emit light at the second illumination level.

Thus the light emitted from the luminaire(s) 4 following step S310 is at a level which motion detection via the light sensor 2 is reliable but is not at a level (e.g. the third illumination level) which consumes a high amount of energy. This advantageously reduces energy consumption of the lighting system 100 as the luminaire(s) 4 will not emit light at the third illumination level upon false detections of motion by the non-optical sensor 3. Due to the sensitivity of the non-optical sensor 3 and thus the possibility of a false motion detection, at step S312 the control module 5 uses the light sensor 2 to perform motion detection such that the light sensor 2 is able to detect motion in the SR associated with the light sensor 2.

Prior to step S312, the light sensor 2 is in an inactive state such that it is not operable to sense motion in its associated SR i.e. the light sensor 2 is turned off. Thus at step S312, the control module 5 transmits a control signal to activate the light sensor 2 from the inactive state (i.e. turns the light sensor 2 on) such that the light sensor 2 is operable to sense motion in its associated SR.

If it is determined at step S314 that no motion is detected by the light sensor 2 in the SR associated with the light sensor 2, the process 300 proceeds back to step S302 where the control module 5 controls the luminaire(s) 4 to operate in the first operating state or a further operating state in which the luminaire(s) 4 illuminates the environment of the lighting system 100 according to an illumination level lower than the second illumination level. Thus the control module 5 determines that the motion detection by the non-optical sensor 3 at step S308 was a false trigger and therefore dims-down (i.e. decreases) the light emitted from the luminaire(s) 4.

The control module 5 may be configured to determine that no motion is detected by the light sensor 2 based on not receiving a signal indicative of sensed motion from the light sensor 2 within a predetermined time period from the light sensor 2 being activated (i.e. turned on) to perform motion detection. Alternatively, the control module 5 may be configured to determine that no motion is detected by the light sensor 2 based on receiving a signal indicative of no sensed motion from the light sensor 2, the light sensor 2 being configured to send the signal indicative of no sensed motion to the control module 5 if the light sensor 2 does not sense motion in its associated SR within a predetermined time period from the light sensor 2 being activated to perform motion detection. The predetermined time periods referred to above are set dependent on the application of the lighting system 100. The predetermined time periods could be of the order of a few minutes or tens of minutes. It will be appreciated these are merely examples and shorter or longer time periods may be used.

If the control module 5 receives a signal indicative of sensed motion from the light sensor 2 within a predetermined time period from the light sensor 2 being activated to perform motion detection (i.e. the light sensor 2 verifies the motion detection by the non-optical sensor 3), the control module 5 determines at step S314 that the motion detection by the non-optical sensor 3 at step S308 was not a false trigger and therefore further dims-up (i.e. increases) the light emitted from the luminaire(s) 4 by controlling the luminaire(s) 4 to emit light at the third illumination level by controlling the luminaire(s) 4 to operate in the third operating state at step S316.

Whilst the luminaire(s) 4 are operating in the third operating state, the process 300 proceeds to step S318 where the control module 5 continues to use the light sensor 2 to perform motion detection in its associated SR.

Whilst the light sensor 2 detects motion in its associated SR, the luminaire(s) 4 remain operating in the third operating state. This is represented in FIG. 3*a* by the process 300 proceeding from step S320 back to step S318 following the light sensor 2 detecting motion in its associated SR.

If it is determined at step S320 that no motion is detected by the light sensor 2 in its associated sensing region, the process 300 proceeds back to step S302 where the control module 5 controls the luminaire(s) 4 to operate in the first operating state or a further operating state in which the luminaire(s) 4 illuminates the environment of the lighting system 100 according to an illumination level lower than the second illumination level.

As will be apparent from the above, the control module 5 controls the luminaire(s) 4 to operate in the third operating state and thus emit light at the third illumination level (provide good illumination in the environment of the lighting system 100) only when the light sensor 2 has also sensed motion in its SR whilst there is sufficient light input into the light sensor 2 for accurate motion detection to be performed by the light sensor 2 i.e. when the light sensor 2 has verified the motion detection by the non-optical sensor 3. This conserves energy by preventing the luminaire(s) 4 operating in the high energy consuming third operating state when detection by the non-optical sensor 3 is a false trigger.

It will be appreciated that in the process 300 the control module 5 does not receive any information pertaining to the amount of light ($I_s$) incident on the light sensor 2. Given the risk that that the illumination level of the environment of the lighting system may be poor (i.e. during night-time) and thus the amount of light ($I_s$) incident on the light sensor 2 may not be above a threshold level of light that must be incident on the light sensor 2 to perform accurate motion detection in its associated SR, the process 300 increases the light emitted from the luminaire(s) 4 to the second illumination level (in the event of the non-optical sensor 3 sensing motion) such that the light input into the light sensor 2 is at a sufficient illumination level for reliable motion detection by the light sensor 2, before using the light sensor 2 to perform motion detection in order to verify (or not) the motion detection by the non-optical sensor 3.

It will be appreciated that in certain scenarios, the amount of light incident on the light sensor 2 may be above the threshold level of light that must be incident on the light sensor 2 to perform accurate motion detection in its associated SR.

A process 350 for controlling the amount of light emitted from the luminaire(s) 4 which takes into account whether there is sufficient light input into the light sensor 2, is now described in more detail with reference to FIG. 3*b*.

Figure 3B:
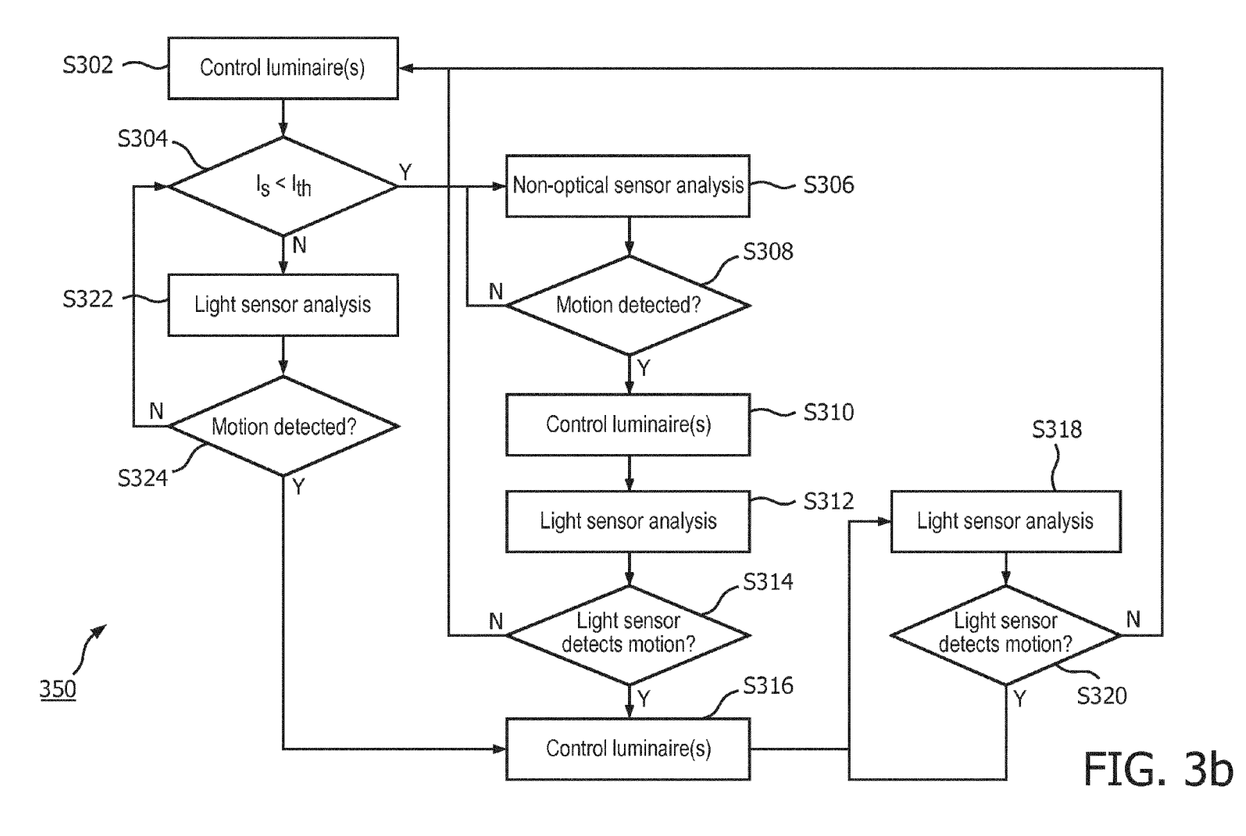
FIG. 3b is a schematic flow chart of a sensing method.

In FIG. 3*b*, steps S302, S306, S308, S310, S312, S314, S316, S318 and S320 correspond to the respective like-numbered steps described above with reference to FIG. 3*a*. For conciseness a description of these steps is not repeated herein.

At step S304 of the process 350, whilst the luminaire(s) 4 are controlled to operate in the first operating state, it is determined whether there is sufficient light input into the light sensor 2 for accurate motion detection to be performed by the light sensor 2.

Step S304 may implemented in a number of ways.

In one implementation, at step S304 the light sensor 2 determines the amount of light incident on the light sensor 2. Techniques for making such a determination are well known in the art and are therefore not described in detail herein. The light sensor 2 is calibrated apriori with a threshold level of light that must be incident on the light sensor 2 (for example a threshold illuminance value) to perform accurate motion detection in its associated SR. The light sensor 2 includes processing functionality such that the light sensor 2 is able to make the determination at step S304 by comparing the level (amount) of light incident on the light sensor 2 with the pre-configured threshold level of light. Once the light sensor 2 makes the determination at step S304, the light sensor 2 sends an indication of the result of the determination to the control module 5.

In another implementation, instead of the light sensor 2 making the determination at step S304, the control module 5 is pre-configured with the threshold level of light that must be incident on the light sensor 2 to perform accurate motion detection in its associated SR, and receives from the light sensor 2, an indication of the amount of light incident on the light sensor 2. The control module 5 makes the determination at step S304 by comparing the amount of light incident on the light sensor 2 with the threshold level of light that must be incident on the light sensor 2 to perform accurate motion detection.

In the above implementations, following step S302, the control module 5 transmits a control signal to the light sensor 2 via interface 6*a* to activate the light sensor 2 from an inactive state. Following the activation, the light sensor 2 is then operable to function as described above. In the implementations described above, if it is determined that there is insufficient light input into the light sensor 2 for accurate motion detection to be performed by the light sensor 2 at step S304, the control module 5 transmits a control signal to the light sensor 2 via interface 6*a* to deactivate the light sensor 2 such that the light sensor 2 returns to an inactive state prior to step S306.

In another implementation, the control module 5 may receive an estimate of the amount of light incident on the light sensor 2 from a further sensor not shown in the lighting system 100 of FIG. 1. The further sensor is positioned in the environment of the lighting system 100 to estimate the amount of light incident on the light sensor 2. Referring back to FIGS. 2*a* and 2*b*, the further sensor may be located in portion 206 of the outdoor light with the other components of the lighting system 100. Alternatively, the further sensor may be external to the outdoor light but still positioned in the environment of the lighting system 100 such that it is able to estimate the amount of light incident on the light sensor 2. The control module 5 receives an indication of the amount of light incident on the light sensor 2 from the further sensor via a suitable interface of the controller 1. The control module 5 makes the determination at step S304 by comparing the amount of light incident on the light sensor 2 with the threshold level of light that must be incident on the light sensor 2 to perform accurate motion detection.

In yet another implementation, the control module 5 may make the determination at step S304 based on time of day information. For example, if it is during the night and the luminaire(s) 4 are operating in the first operating state, the control module 5 is able to determine that there is insufficient light incident on the light sensor 2 for accurate motion detection to be performed by the light sensor 2 without any feedback from the light sensor 2 due to the lack of natural light in the environment of the lighting system 100. In this implementation, the control module 5 may make the determination at step S304 by receiving time of day information from a timer (not shown in FIG. 1). The timer may be an internal component of the controller 1 in which case it may be an internal or external module of the control module 5. Alternatively the timer may be external to the controller 1. Upon receiving time of day information from the timer, the control module 5 may compare the time of day to a configurable window of time (corresponding to night time e.g. between 22:00 and 05:00) to determine whether it is day or night and thus determine if there is sufficient light incident on the light sensor 2 for accurate motion detection to be performed by the light sensor 2 whilst the luminaire(s) 4 are operating in the first operating state.

If the control module 5 determines at step S304 that there is insufficient light incident on the light sensor 2 for the light sensor 2 to perform accurate motion detection in its associated SR), the process 350 proceeds to step S306 and the process continues as described above with reference to FIG. 3a.

Returning back to step S304, if the control module 5 determines that there is sufficient light input into the light sensor 2 for accurate motion detection to be performed by the light sensor 2 then the process 350 proceeds to step S322, where the control module 5 uses the light sensor 2 to perform motion detection.

In absence of the control module 5 receiving a signal indicative of sensed motion from the light sensor 2, the luminaire(s) 4 remain operating in the first operating state. This is represented in FIG. 3b by the process 350 proceeding from step S324 to step S304 following no motion being detected by the light sensor 2.

If the control module 5 receives a signal indicative of sensed motion from the light sensor 2, the process 350 proceeds from step S324 to step S316 where the control module 5 controls the luminaire(s) 4 to operate in the third operating state.

Should the light sensor 2 detect motion in the SR associated with the light sensor 2 at step S324, then it is acceptable to control the luminaire(s) 4 to operate in the third operating state (emit light at the third illumination level) because there is sufficient light input into the light sensor 2 to enable the light sensor 2 to accurately detect motion in the SR associated with the light sensor 2 (determined at step S304).

Whilst there is sufficient light input into the light sensor 2 to enable use of the more accurate light sensor 2 the control module 5 does not control the luminaire(s) 4 based on signals from the non-optical sensor 3 i.e. any signal received at the control module 5 from the non-optical sensor 3 is ignored.

It will be appreciated from the above that the processing requirements of the light-sensor 2 are reduced because the light sensor 2 performs motion detection (i.e. video processing) in its SR only when required.

Figure 4A:
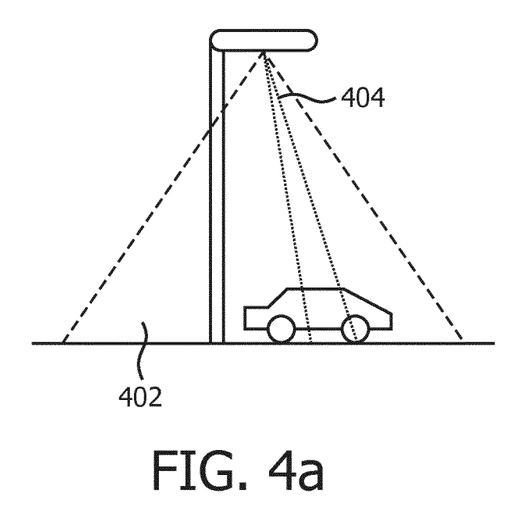
FIGS. 4a-b illustrates a scenario with sensors having overlapping sensing regions.
Figure 4B:
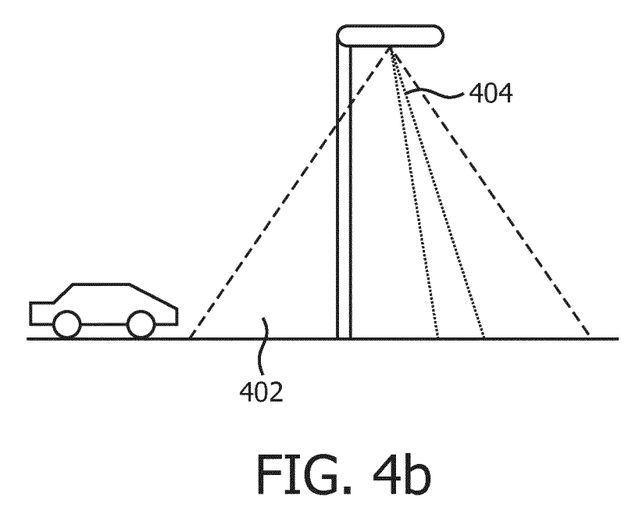

As described above both the light sensor 2 and the non-optical sensor 3 have a SR defined by the range of the respective sensor. Reference is now made to FIG. 4 which illustrates a scenario resulting from a lighting system 100 in which the light sensor 2 and the non-optical sensor 3 have overlapping SRs.

FIGS. 4a and 4b illustrate an example where the lighting system 100 is used in an outdoor light suitable for lighting car parks and roads etc. As shown in FIGS. 4a and 4b, the lighting system 100 may be configured such that the light sensor 2 has a SR 402 which overlaps the SR 404 of the non-optical sensor 3. FIG. 4a illustrates a vehicle passing through the SR 404 of the non-optical sensor 3 whilst the luminaire(s) 4 are operating in the first operating state. Referring back to FIGS. 3a and 3b, it will be appreciated that there will be a time delay (for example of the order of a few hundred milliseconds to a few seconds) between the non-optical sensor 3 sensing motion and the luminaire(s) 4 emitting light at the second illumination level at step S310 and the light sensor 2 being activated to perform motion detection at step S312. This time delay arises from for example (i) the time taken for the non-optical sensor 3 to process the sensed detection and generate a signal indicative of sensed motion, (ii) the time taken for the control module 5 to receive and process the signal indicative of sensed motion, and transmit an appropriate control signal to the luminaire(s) 4, (iii) the time taken for the luminaire(s) 4 to change operating state to the second operating state in response to this control signal, and (iv) the time taken for the control module 5 to generate and transmit a control signal to the light sensor and for the light sensor to activate in response to receiving this control signal. Additional factors may contribute to this time delay not described herein.

In response to the non-optical sensor 3 sensing the vehicle in the SR 404 and the control module 5 receiving a signal indicative of sensed motion from the non-optical sensor 3, the control module 5 dims-up the light emitted from the luminaire(s) 4 by controlling the luminaire(s) 4 to operate in the second operating state and thus emit light at the second illumination level. However, if the vehicle is travelling at a fast enough speed, the vehicle may have passed through the SR 402 of the light sensor 2 before the increase in light emitted from the luminaire(s) 4 occurs at step S310 and the light sensor 2 is activated to perform motion detection at step S312, this is shown in FIG. 4b. As a result, the light sensor 2 will not sense the presence of the vehicle in the SR 404 and the control module 5 will control the luminaire(s) 4 to operate in the first operating state or a further operating state in which the luminaire(s) 4 illuminate the environment according to an illumination level lower than the second illumination level.

Thus it will be appreciated that in this particular application of the lighting system 100, if the light sensor 2 has a SR 402 which overlaps the SR 404 of the non-optical sensor 3, the luminaire(s) 4 may not be controlled to operate in the third operating state to emit light at the third illumination level even if a vehicle passes through both the SR 402 of the light sensor 2 and the SR 404 of the non-optical sensor 3.

Figure 5A:
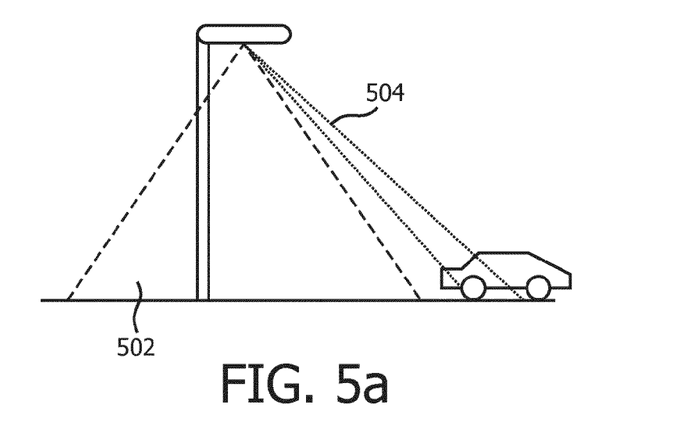
FIGS. 5a-c illustrates a scenario with sensors having non-overlapping sensing regions.
Figure 5B:
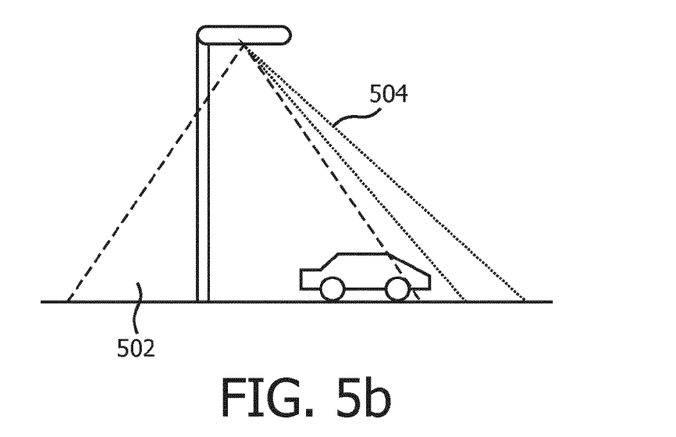
Figure 5C:
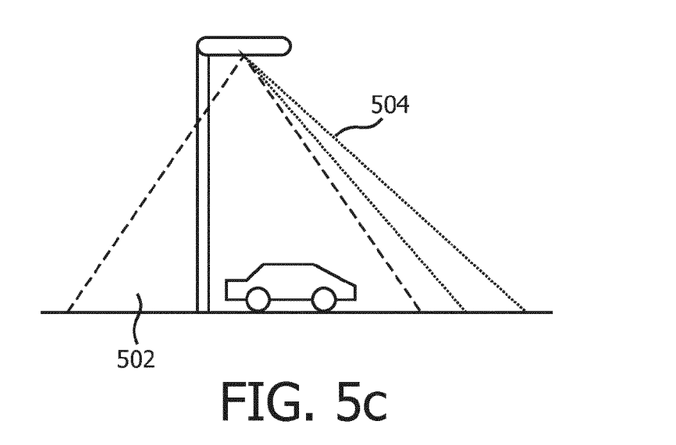

The lighting system 100 may be configured such that the light sensor 2 and the non-optical sensor 3 have non-overlapping sensing regions. This is described with reference to a scenario shown in FIGS. 5a-c. Improved performance is achieved due to the SR 504 of the non-optical sensor 3 being focused outside of the SR 502 of the light sensor 2 to decide optimal timing of increasing the light emitted from the luminaire(s) 4 to the second illumination level. In particular the SR 504 of the non-optical sensor 3 defines a region in which a vehicle will pass though before passing through the SR 502 of the light sensor 2. Whilst FIGS. 5a-c show a vehicle travelling from right to left, it will be appreciated that when the lighting system 100 is used to detect vehicles travelling in the opposite direction (left to right), the SR 504 of the non-optical sensor 3 is still focused outside of the SR 502 of the light sensor 2 such that a vehicle will pass through the SR 504 of the non-optical sensor 3 before passing through the SR 502 of the light sensor 2. FIG. 5a illustrates a vehicle passing through the SR 504 of the non-optical sensor 3 whilst the luminaire(s) 4 are operating in the first operating state.

In response to the non-optical sensor 3 sensing the vehicle in the SR 504 and the control module 5 receiving a signal indicative of sensed motion from the non-optical sensor 3, the control module 5 dims-up the light emitted from the luminaire(s) 4 by controlling the luminaire(s) 4 to operate in the second operating state and thus emit light at the second illumination level.

Even if the vehicle is travelling is at high speed, due to the pre-emptive (forward view) sensing of the non-optical sensor 3, the increase in light emitted from the luminaire(s) 4 occurs at step S310 and the light sensor 2 is activated to perform motion detection at step S312 such that the vehicle passes through the SR 502 of the light sensor 2 whilst the luminaire(s) 4 are operating in the second operating state and thus emitting light at the second illumination level, and the light sensor 2 is activated to perform motion detection—this is shown in FIG. 5b. As a result, the light sensor 2 will sense the presence of the vehicle in the SR 502 and the control module 5 will control the luminaire(s) 4 to operate in the third operating state. Thus the light emitted from the luminaire(s) 4 will increase to the third illumination level at step S316 to provide good illumination for the vehicle, this is shown in FIG. 5c. Thus as will be apparent, the pre-emptive sensing of fast-approaching objects by the forward-view non-optical sensor 3 can help improve the overall performance of the lighting system 100 by ensuring that the luminaire(s) 4 are controlled to operate in the third operating state to emit light at the third illumination level when a vehicle passes through both the SR 502 of the light sensor 2 and the SR 504 of the non-optical sensor 3.

It will be appreciated the above embodiments have been described only by way of example.

Whilst FIG. 1 shows a single non-optical sensor 3 for simplicity, it will be appreciated that in various implementations there may be more than one non-optical sensor 3 coupled to the controller 1. In these implementations, if the control module 5 receives a signal indicative of sensed motion from any of the non-optical sensors, the control module 5 will act in accordance with FIG. 3a or FIG. 3b described above. Additionally or alternatively, whilst FIG. 1 shows a single light sensor 2 for simplicity, it will be appreciated that there may be more than one light sensor 2 coupled to the controller 1 (for example the light sensor 2 may comprise an array of PSDs). In this implementation, if the control module 5 receives a signal indicative of sensed motion from any of the plurality of light sensors, the control module 5 will act in accordance with FIG. 3 described above.

Whilst embodiments have been described above with reference to detecting motion of a vehicle in a sensing region, embodiments extend to the detection of motion of any being (whether human or otherwise) or object.

Where it is said above that a value is within a limit or threshold (or the like), this covers the options of either a "less than" type operation or a "less than or equal" to type operation.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller comprising:
   an output for controlling one or more lighting device to illuminate an environment;
   an input for receiving motion detection signals from a non-optical sensor and from a light sensor; and
   a control module configured to:
   use the non-optical sensor to perform motion detection;
   in response to receiving a signal indicative of sensed motion from the non-optical sensor whilst the one or more lighting device is operating in a first operating state in which the one or more lighting device illuminates the environment according to a first illumination level or emits no light, control the one or more lighting device to operate in a second operating state in which the one or more lighting device illuminates the environment according to a second illumination level, the second illumination level being higher than the first illumination level;
   use the light sensor to perform motion detection whilst the one or more lighting device is operating in the second operating state;
   if no motion is detected by the light sensor, control the one or more lighting device to operate in the first operating state or a further operating state in which the one or more lighting device illuminates the environment according to an illumination level lower than the second illumination level; and
   in response to receiving a signal indicative of sensed motion from the light sensor, control the one or more lighting device to operate in a third operating state in which the one or more lighting device illuminates the environment according to a third illumination level, the third illumination level being higher than the second illumination level.

2. The controller of claim 1, wherein using the light sensor to perform motion detection comprises activating the light sensor from an inactive state.

3. The controller of claim 2, wherein the control module is configured to determine that no motion is detected by the light sensor if the control module does not receive a signal indicative of sensed motion from the light sensor within a predetermined time period from said activation.

4. The controller of claim 2, wherein the control module is configured to determine that no motion is detected by the light sensor based on receiving a signal from the light sensor, said signal indicating that the light sensor has detected no motion within a predetermined time period from said activation.

5. The controller of claim 1, wherein the control module is configured to use the non-optical sensor to perform motion detection in response to determining that light incident on the light sensor is at a level less than a predetermined light level threshold.

6. The controller of claim 5, wherein the control module is configured to determine that the light incident on the light sensor is at a level less than the predetermined light level threshold based on a detection by the light sensor of the level of light incident on the light sensor.

7. The controller of claim 6, wherein the control module is configured to receive an indication from the light sensor indicating whether the level of light incident on the light sensor is less than said predetermined light level threshold, and determine that the light incident on the light sensor is at a level less than the predetermined light level threshold based on said indication.

8. The controller of claim 6, wherein the control module is configured to receive an indication from the light sensor indicating the level of light incident on the light sensor, and determine that the light incident on the light sensor is at a level less than the predetermined light level threshold based on comparing the level of light incident on the light sensor with the predetermined light level threshold.

9. The controller of claim 5, wherein the control module is configured to determine that the light incident on the light sensor is at a level less than the predetermined light level threshold based on time of day information.

10. The controller of claim 5, wherein the control module is configured to determine that the light incident on the light sensor is at a level less than the predetermined light level threshold based on a detection by a further sensor of the amount of light in the environment.

11. The controller of claim 1, wherein both the non-optical sensor and the light sensor have an associated sensing region, and the sensing region of the non-optical sensor is within the sensing region of the light sensor.

12. The controller of claim 1, wherein both the non-optical sensor and the light sensor have an associated sensing region, and the sensing region of the non-optical sensor is outside the sensing region of the light sensor.

13. The controller of claim 5, wherein in response to determining that light incident on the light sensor is greater than the predetermined light level threshold, the control module configured to:
   use the light sensor to perform motion detection; and
   in response to receiving a signal indicative of sensed motion from the light sensor, control the one or more lighting device to operate in the third operating state.

14. A lighting system comprising:
   the controller according to claim 1;
   the non-optical sensor;
   the light sensor; and
   the one or more lighting device.

15. A non-transitory computer program product for performing sensing using a non-optical sensor and a light sensor to control one or more lighting device to illuminate an environment, the computer program product comprising code embodied on a computer-readable medium and being configured so as when executed on a processor to:
   use the non-optical sensor to perform motion detection;
   in response to receiving a signal indicative of sensed motion from the non-optical sensor whilst the one or more lighting device is operating in a first operating state in which the one or more lighting device illuminates the environment according to a first illumination level or emits no light, control the one or more lighting device to operate in a second operating state in which the one or more lighting device illuminates the environment according to a second illumination level, the second illumination level being higher than the first illumination level;
   use the light sensor to perform motion detection whilst the one or more lighting device is operating in the second operating state;
   if no motion is detected by the light sensor, control the one or more lighting device to operate in the first operating state or a further operating state in which the one or more lighting device illuminates the environment according to an illumination level lower than the second illumination level; and
   in response to receiving a signal indicative of sensed motion from the light sensor, control the one or more lighting device to operate in a third operating state in which the one or more lighting device illuminates the environment according to a third illumination level, the third illumination level being higher than the second illumination level.

* * * * *